US012568984B2

(12) United States Patent
Kroes et al.

(10) Patent No.: US 12,568,984 B2
(45) Date of Patent: Mar. 10, 2026

(54) INSTANT BEVERAGE FOAMING COMPOSITION

(71) Applicant: FrieslandCampina Nederland B.V., Amersfoort (NL)

(72) Inventors: Jan Kroes, Wageningen (NL); Paul Bastiaan Van Seeventer, Wageningen (NL)

(73) Assignee: FrieslandCampina Nederland B.V., Amersfoort (NL)

( * ) Notice: Subject to any disclaimer, the term of this patent is extended or adjusted under 35 U.S.C. 154(b) by 512 days.

(21) Appl. No.: 18/066,731

(22) Filed: Dec. 15, 2022

(65) Prior Publication Data

US 2023/0121591 A1      Apr. 20, 2023

Related U.S. Application Data

(63) Continuation of application No. PCT/EP2021/066083, filed on Jun. 15, 2021.

(30) Foreign Application Priority Data

Jun. 17, 2020    (EP) .................................... 20180570

(51) Int. Cl.
*A23C 13/10*        (2006.01)
*A23C 13/12*        (2006.01)

(52) U.S. Cl.
CPC ........ *A23C 13/125* (2013.01); *A23C 2260/20* (2013.01)

(58) Field of Classification Search
CPC .............. B65D 85/8043; B65D 85/804; B65D 85/8046; A23C 2260/20; A23C 2210/30; A23C 2220/10; A23C 11/10; A23C 13/125; A23J 1/125; A23J 3/346; A23P 10/40; A23P 10/47
See application file for complete search history.

(56) References Cited

U.S. PATENT DOCUMENTS

| | | | | | |
|---|---|---|---|---|---|
| 4,438,147 A | * | 3/1984 | Hedrick, Jr. | ............. | A23G 9/20 426/585 |
| 4,957,767 A | * | 9/1990 | Maria de Kort | .......... | C12C 7/28 426/590 |
| 5,387,425 A | * | 2/1995 | Hsu | .......................... | C12H 1/14 426/329 |
| 5,462,759 A | * | 10/1995 | Westerbeek | ........... | A23C 11/08 426/477 |
| 5,780,092 A | * | 7/1998 | Agbo | ........................ | A23F 5/42 426/570 |
| 5,958,589 A | * | 9/1999 | Glenn | ................... | A23L 29/212 428/321.5 |
| 6,129,943 A | * | 10/2000 | Zeller | ................. | A23C 11/045 426/570 |
| 6,177,119 B1 | * | 1/2001 | Zeller | ....................... | A23F 5/34 426/594 |

| | | | | | |
|---|---|---|---|---|---|
| 6,426,110 B1 | * | 7/2002 | Basa | ...................... | A23C 11/08 426/657 |
| 6,495,180 B1 | * | 12/2002 | Gurol | ........................ | A23F 5/14 426/594 |
| 2002/0081367 A1 | * | 6/2002 | Triantafyllou | ............................. | C12Y 302/01041 426/618 |
| 2002/0127322 A1 | * | 9/2002 | Bisperink | .............. | A23C 11/00 426/570 |
| 2003/0039731 A1 | * | 2/2003 | Dalton | ............... | B65D 85/8061 426/433 |
| 2004/0081724 A1 | * | 4/2004 | Dria | ............... | C12Y 305/01001 426/52 |
| 2004/0156979 A1 | * | 8/2004 | Villagran | ................ | A23F 5/243 426/656 |
| 2005/0008752 A1 | * | 1/2005 | Charman | ................. | A23C 9/15 426/590 |
| 2005/0095341 A1 | * | 5/2005 | Sher | ........................ | A47J 31/41 426/594 |
| 2006/0040023 A1 | * | 2/2006 | Zeller | .................... | A23C 11/04 426/438 |
| 2006/0110516 A1 | * | 5/2006 | Holtus | ...................... | A23F 5/40 426/569 |
| 2007/0014892 A1 | * | 1/2007 | Mitchell | ................... | A23L 9/10 426/28 |
| 2007/0054027 A1 | * | 3/2007 | Weisser | .................. | C08B 30/14 426/601 |
| 2007/0116820 A1 | * | 5/2007 | Prakash | .................... | A23L 9/12 426/548 |
| 2007/0116823 A1 | * | 5/2007 | Prakash | .................. | A23L 27/36 426/548 |
| 2008/0032033 A1 | * | 2/2008 | Nie | ........................ | A23K 40/20 426/656 |

(Continued)

FOREIGN PATENT DOCUMENTS

| | | | | |
|---|---|---|---|---|
| WO | WO-2010/065790 | | 6/2010 | |
| WO | WO-2010/071425 A2 | | 6/2010 | |
| WO | WO-2012/050439 A1 | | 4/2012 | |
| WO | WO-2018091409 A1 | * | 5/2018 | ........... A23C 9/1307 |
| WO | WO-2019/122336 | | 6/2019 | |

* cited by examiner

OTHER PUBLICATIONS

International Search Report and Written Opinion mailed Sep. 3, 2021 for PCT/EP2021/066083.

*Primary Examiner* — Ericson M Lachica

(74) *Attorney, Agent, or Firm* — Sunit Talapatra; Foley & Lardner LLP

(57) ABSTRACT

The present invention relates to an instant foamable beverage creamer comprising vegetable intact protein, for instance oat and/or rice protein, vegetable oil or fat, carbohydrates, and a hydrolyzed plant protein with a defined degree of hydrolysis which provides an excellent foam layer on a beverage.

15 Claims, No Drawings

(56)             References Cited

U.S. PATENT DOCUMENTS

| | | | | |
|---|---|---|---|---|
| 2008/0069924 A1* | 3/2008 | Zeller | A21D 2/18 | 426/512 |
| 2008/0107786 A1* | 5/2008 | Barnekow | A23F 5/405 | 426/519 |
| 2008/0254169 A1* | 10/2008 | Macmahon | B65D 85/8049 | 426/77 |
| 2008/0317931 A1* | 12/2008 | Mandralis | A23F 5/24 | 426/594 |
| 2009/0123618 A1* | 5/2009 | Gandhi | A23L 2/02 | 426/507 |
| 2009/0162489 A1* | 6/2009 | Singh | A23C 11/02 | 426/562 |
| 2010/0021583 A1* | 1/2010 | Alarcon Camacho | C12C 5/02 | 426/12 |
| 2010/0055266 A1* | 3/2010 | Windhab | A23G 9/20 | 426/317 |
| 2010/0104717 A1* | 4/2010 | Zeller | A23G 1/56 | 426/443 |
| 2010/0178391 A1* | 7/2010 | MacMahon | B65D 85/8061 | 426/78 |
| 2010/0203198 A1* | 8/2010 | Yoakim | B65D 85/8061 | 426/80 |
| 2010/0215826 A1* | 8/2010 | Campbell | A21D 13/04 | 426/549 |
| 2011/0020525 A1* | 1/2011 | Homsma | A23L 2/52 | 426/616 |
| 2011/0236545 A1* | 9/2011 | Brown | A23C 11/103 | 426/656 |
| 2011/0293811 A1* | 12/2011 | Linqiu | A23F 5/243 | 426/609 |
| 2011/0293814 A1* | 12/2011 | Alexandre | A23L 19/07 | 426/577 |
| 2011/0318455 A1* | 12/2011 | Funda | A61K 9/1682 | 426/61 |
| 2012/0021113 A1* | 1/2012 | Villagran | A23L 5/11 | 426/549 |
| 2012/0070542 A1* | 3/2012 | Camera | B65D 85/8052 | 426/77 |
| 2012/0270766 A1* | 10/2012 | Rueda Cabrera | A23L 33/185 | 514/1.1 |
| 2013/0059928 A1* | 3/2013 | Dhalleine | A23L 33/18 | 426/654 |
| 2013/0158251 A1* | 6/2013 | Lee | A23L 29/219 | 536/106 |
| 2013/0202749 A1* | 8/2013 | Yauk | B65D 85/73 | 426/115 |
| 2013/0209649 A1* | 8/2013 | Chanet | H01L 21/67353 | 426/594 |
| 2013/0266718 A1* | 10/2013 | van der Vegt | A23L 9/20 | 426/656 |
| 2014/0205731 A1* | 7/2014 | Kloek | A23L 23/10 | 426/589 |
| 2014/0220191 A1* | 8/2014 | Kelly | B65D 85/8049 | 426/115 |
| 2014/0370181 A1* | 12/2014 | Young | A23F 5/04 | 426/507 |
| 2015/0064333 A1* | 3/2015 | van Seeventer | A23G 1/56 | 426/595 |
| 2015/0296867 A1* | 10/2015 | Mazer | B01F 23/41 | 426/512 |
| 2015/0376176 A1* | 12/2015 | Adamski-Werner | A23L 33/15 | 544/11 |
| 2016/0151243 A1* | 6/2016 | Sydow | A61J 3/07 | 264/4.1 |
| 2016/0198754 A1* | 7/2016 | Carder | C12P 19/14 | 426/598 |
| 2016/0302463 A1* | 10/2016 | Woodyer | A21D 2/36 | |
| 2016/0374379 A1* | 12/2016 | Passe | A23L 27/63 | 514/772 |
| 2017/0196243 A1* | 7/2017 | Baxter | A23L 33/185 | |
| 2017/0265505 A1* | 9/2017 | Bansal-Mutalik | A23L 7/109 | |
| 2017/0295835 A1* | 10/2017 | Durbin | A23P 30/40 | |
| 2019/0045826 A1* | 2/2019 | Barata | A23L 9/24 | |
| 2019/0110508 A1* | 4/2019 | Bunce | A23L 29/238 | |
| 2019/0216106 A1* | 7/2019 | Geistlinger | A23C 11/06 | |
| 2019/0269151 A1* | 9/2019 | Solorio | A21D 13/04 | |
| 2020/0015491 A1* | 1/2020 | Schultz | A23F 5/465 | |
| 2020/0077691 A1* | 3/2020 | Dewille | A23L 33/17 | |
| 2020/0236981 A1* | 7/2020 | Rousset | A23L 9/24 | |
| 2020/0268778 A1* | 8/2020 | Erickson | A61K 9/0056 | |
| 2020/0296982 A1* | 9/2020 | Chaudemanche | A23C 11/06 | |
| 2020/0305477 A1* | 10/2020 | Wang | A23J 3/346 | |
| 2020/0329726 A1* | 10/2020 | Waksman | A23L 29/015 | |
| 2020/0390136 A1* | 12/2020 | Myllärinen | A23L 7/107 | |
| 2021/0084922 A1* | 3/2021 | Wooster | A23L 9/24 | |

INSTANT BEVERAGE FOAMING COMPOSITION

CROSS-REFERENCE TO RELATED APPLICATIONS

This application is a continuation of International Patent Application No. PCT/EP2021/066083 filed Jun. 15, 2021, which application claims the benefit of European Patent Application No. 20180570.2 filed on Jun. 17, 2020, both of which are incorporated herein by reference in their entireties.

FIELD OF THE INVENTION

The invention relates to an all-vegetable spray-dried, instant foamable beverage creamer, to a method of preparing such a creamer, to a method of making a foamed beverage having a foam layer on top using the foamable creamer, and a sealed capsule comprising the creamer.

BACKGROUND TO THE INVENTION

Instant beverage creamers are widely known as powders, mostly in spray dried form, that provide taste and a milky appearance to a variety of beverages such as coffee and tea and sometimes also chocolate beverages. Such powdered creamers were developed long ago as alternative to milk, concentrated milk and cream, traditionally used to whiten beverages.

These instant creamers contain generally vegetable fat, mostly fully saturated, but no milk fat, to avoid the formation of rancidity during storage. In the art, such creamers are also known as "non-dairy creamers" (NDC), even though they may contain milk protein.

A further development of these creamers resulted in the invention of beverage foamers, which are basically creamers with a slightly different fat and protein level, but wherein a gas is captured, which gas is released upon contact with a liquid, forming a foam head.

Production of a good instant beverage foamer is technologically more challenging than a creamer. For a foamer it is important to quickly dissolve in the liquid, thereby producing preferably fine bubbles that are stable for a certain amount of time. Moreover, a high enough foam head must be formed to provide the beverage with an attractive appearance and no off-taste.

Powders for instant foamers (which may also include coffee extracts) can be sold in pots, sachets or sticks. The consumer pours the content of these packages in a cup, after which hot or cold water is added, resulting in a beverage with a foam layer.

Recently, instant foamer-creamer powders are also sold in sealed capsules, which are applied in single serve (high pressure) coffee brewing machines such as Tassimo® and Dolce Gusto®.

Powdered instant foamers are made nowadays mostly using milk protein, such as skim milk powder and/or caseinate, vegetable fat and carbohydrates such as glucose syrups. In particular, the milk proteins are popular to use since they have good emulsifying capacity during the production of the foamer, contribute to the foaming capacity of the foamer, and stabilize the foam on the beverage.

For a number of years, there has been an increasing demand for completely dairy free creamers and foamers. For instance, an increasing number of people adopt a vegetarian or vegan lifestyle; others are concerned about the carbon footprint of dairy products; yet another group suffers from allergic reactions caused by milk protein, or are lactose intolerant. Some solutions were proposed using wheat as replacement for milk protein, but this would be unacceptable for individuals suffering from celiac disease. The term "non-dairy creamers" or "non-dairy foamers" would suggest that they could be applied in the fields mentioned above, However, as explained hereinbefore, these may also contain milk protein and/or lactose and are therefore not suitable.

WO 2019/122336 relates to a powdered creamer composition comprising plant protein having a specific median molecular weight, sodium bicarbonate and citric acid and has good sensorial properties. It is said to be stable when added to beverages such as coffee without the need for additional stabilizers.

From the above it is clear that there is a high need for an instant, foamable beverage creamer, that is based on only vegetable components, and still has excellent foaming power, forms a nice high and stable foam layer, has a good taste, and it suitable for individuals having limitations or requirements as stated hereabove. Such a desirable instant foamable beverage creamer should also be suitable to quickly dissolve from a capsule used in single serve brewing machines.

SUMMARY OF THE INVENTION

It has now been found that an instant vegetable foamable creamer could be prepared that shows high functionality in foam formation and stability when added to beverages, has an good taste, and meets the specific requirements of several groups of consumers stated hereabove.

Accordingly, in a first aspect the invention relates to a spray-dried, foamable beverage creamer comprising the components:
- (a) 1-15 wt. % of protein selected from the group of native oat protein, native rice protein and mixtures thereof;
- (b) 15-60 wt. % of vegetable oil and/or vegetable fat;
- (c) 25-65 wt. % of carbohydrates
- (d) 0.5-5% wt. % of hydrolyzed plant protein selected from the group of hydrolyzed pea protein, hydrolyzed rice protein and mixtures thereof;
- (e) 0-9 wt. % of other constituents preferably selected from the group consisting of stabilizers; emulsifiers; free-flowing agents; buffering agents; non-starch polysaccharides such as xylan, glucan, arabinan and galactan; minerals; water and mixtures thereof;

and wherein components (a)-(e) together form 100% by weight of said spray-dried, foamable beverage creamer.

In a second aspect, the invention relates to a method for preparing a spray-dried foamable beverage creamer according to the invention, comprising the steps:
- a. Providing an aqueous dispersion comprising hydrolyzed oat and/or hydrolyzed rice flour,
- b. Mixing a vegetable oil or vegetable fat, carbohydrates and a hydrolyzed plant protein selected from the group of hydrolyzed pea protein, hydrolyzed rice protein and mixtures thereof with the aqueous dispersion of step (a) to obtain an aqueous foamer concentrate having a total dry solids content of 30-70 wt. % based on the total weight of said aqueous foamer concentrate;
- c. Emulsifying the aqueous foamer concentrate;
- d. Optionally injecting a gas into the emulsified aqueous foamer concentrate; and
- e. Spray-drying the aqueous foamer concentrate.

In a third aspect, the invention relates to a method for preparing a foamed beverage having a foam layer on top comprising combining the beverage foamer according to claim 1 with a liquid and optionally an additional powdered beverage composition In fourth aspect, the invention relates to a sealed capsule comprising the foamable creamer according to claim 1.

In a fifth aspect, the invention relates to a spray dried foamable beverage creamer obtainable by the method comprising a. Providing an aqueous dispersion comprising hydrolyzed oat and/or hydrolyzed rice flour;

b. Mixing a vegetable oil or fat, carbohydrates and a hydrolyzed plant protein with the aqueous dispersion of step (a) to obtain an aqueous foamer concentrate having a total dry solids content of 35-65 wt. %;

c. Emulsifying the aqueous foamer concentrate;

d. Optionally injecting a gas into the emulsified aqueous foamer concentrate; and e. Spray drying the aqueous foamer concentrate.

DETAILED DESCRIPTION

All percentages are defined on a weight by weight basis.

Throughout the specification, the term "foamable creamer" has the same meaning as "instant foamable beverage creamer".

The finding to which the invention relates is a dry powdered foamable creamer that contains one or more hydrolyzed vegetable flour types, which originally contain starch and protein, and which starch has been extensively hydrolyzed; suitable vegetable oils or fats; carbohydrates; and one or more hydrolyzed vegetable proteins. In particular, it was found that the presence of oat flour or rice flour of which the starch has been extensively hydrolyzed and the hydrolyzed plant protein as part of the foaming creamer, produced an excellent functional foaming creamer.

Hence, in a first aspect the invention pertains to a spray-dried, foamable beverage creamer comprising the components:

(a) 1-15 wt. % of protein selected from the group of native oat protein, native rice protein and mixtures thereof;

(b) 15-60 wt. % of vegetable oil and/or vegetable fat;

(c) 25-65 wt. % of carbohydrates;

(d) 0.5-5% wt. % of hydrolyzed plant protein selected from the group of hydrolyzed pea protein, hydrolyzed rice protein and mixtures thereof;

(e) 0-9 wt. % of other constituents preferably selected from the group consisting of stabilizers; emulsifiers; free-flowing agents; buffering agents; non-starch polysaccharides such as xylan, glucan, arabinan and galactan; minerals; and water;

and wherein components (a)-(e) together form 100% by weight of the spray-dried, foamable beverage creamer.

The foamable beverage creamer is preferably essentially dairy free. Hence, the foamable beverage creamer preferably contains less 1000 ppm, more preferably less than 200 ppm, and most preferably less than 100 ppm of dairy parts such as dairy protein, dairy fat and/or lactose.

The foamable beverage creamer preferably comprises more than 2.5 wt. % more preferably more than 2.9 wt. % most preferably more than 3.5 wt. % native oat protein, native rice protein, or mixtures thereof.

Preferably, the foamable beverage creamer comprises less than 14 wt. %, more preferably less than 12 wt. %, most preferably less than 10 wt. % native oat protein, native rice protein or mixtures thereof.

In a preferred embodiment, the foamable beverage creamer comprises 2.5-14 wt. % native oat protein, native rice protein, or mixtures thereof.

It was found that the presence of native oat protein, native rice protein or mixtures thereof in the foamable beverage creamer contributed to a good foam stability, as evidenced in the examples.

For the purpose of the invention, native protein is protein that has not undergone any protein hydrolysis action, i.e. its amino acid backbone has not been split by an enzyme or a chemical hydrolysis step. Therefore, concerning the invention, a native protein is considered to be unhydrolyzed (which is also denoted in the art as "intact protein").

Preferably, the molecular weight of the native protein thus has a molecular weight of more than 20.000 Dalton, preferably more than 21.000 Dalton, determined by SDS-PAGE. (D. M. Londono et al., Journal of Cereal Science, Volume 58, Issue 1, July 2013, Pages 170-177.) The protein selected from the group of native oat protein and native rice protein may be derived from a flour in which it is present. This flour is also a source of carbohydrates, preferably starch. Oat flour contains about 65 wt. % starch and about 12 wt. % native oat protein. Rice flour contains about 78 wt. % starch, and about 7 wt. % native rice protein.

Preferably, the vegetable oil or vegetable fat is present in the foamable beverage creamer of the invention in amounts of 16-55 wt. %, more preferably between 17-50 wt. %, even more preferably between 19 and 40 wt. %, most preferably between 20 and 30 wt. %.

The fat or oil used is preferably non-hardened, natural oil or fat. The oil or fat may also be fully hardened, provided that the amount of trans-fatty acids is below 1 wt. %, preferably below 0.1 wt. %.

Preferred vegetable oil or fat comprises palm oil, palm kernel oil, coconut oil, sunflower oil, high oleic sunflower oil, rapeseed oil soy oil, and mixtures thereof. Most preferred oil or fat is unhardened coconut oil, as it has the best sensory profile.

The amount of carbohydrates in the foamable beverage creamer is preferably 30-63 wt. %, more preferably 45-60 wt. % most preferably 48-58 wt. %.

The carbohydrates in the foamable beverage creamer comprise at least mono-, di- and trisaccharides, preferably glucose, maltose and maltotriose.

A part of these saccharides originate from the starch in the flour used. The formation of these saccharides, preferably glucose and maltose, has the advantage that in situ during the preparation method of the foamable creamer, sweetness is generated. As a consequence, the amount of carbohydrates normally added in the preparation of the foamable creamer, can be reduced.

Hence, in an embodiment, the carbohydrates in the foamable beverage creamer according the invention comprise 10-30 wt. % of mono- and disaccharides selected from the group of glucose, maltose and mixtures thereof.

The presence of intact starch (in particular amylose and amylopectin) is not required and even undesirable as it may lead to viscosity problems. It is therefore preferred that the foamable creamer does not contain significant amounts of intact starch. Accordingly, the foamable creamer contains preferably less than 5 wt. %, more preferably less than 1 wt. %, most preferably less than 0.1 wt. % intact starch. For the purpose of the invention, intact starch is starch that has not undergone any enzymatic and/or chemical hydrolysis or derivatization of the polymeric glucose backbone. It also has not been subjected to temperatures substantially above its gelatinization temperature.

The carbohydrates may further comprise glucose syrup, maltodextrin and mixtures thereof, preferably in an amount of 40-70 wt. %, more preferably 45-65 wt. %, most preferably 50-62 wt. %, based on the carbohydrates. Preferably, glucose syrup has a DE (dextrose equivalents) between 20-48; preferably maltodextrin has a DE between 14-19. Most preferably glucose syrup is used.

The hydrolyzed plant protein selected from the group of hydrolyzed pea protein, hydrolyzed rice protein and mixtures thereof in the foamable beverage creamer of the invention may be derived from any food acceptable pea or rice source. The seeds are the preferred source. Hydrolyzed plant protein relates to protein products of which one or more peptide bonds of the amino acid chain have been split. This may be achieved by chemical and/or enzymatic hydrolysis. In one embodiment, the hydrolyzed plant protein has been enzymatically hydrolyzed. In another embodiment, the hydrolyzed plant protein has been chemically hydrolyzed, preferably alkali hydrolyzed.

Preferably, the hydrolyzed plant protein in the foamable creamer is present in an amount of 0.75-4.5 wt. %, more preferably 1.0-4.0 wt. %, most preferably 1.2-3.7 wt. %.

The amount of hydrolyzed plant protein refers to the protein part only, wherein the protein is defined as the nitrogen content of the hydrolyzed plant protein multiplied by the nitrogen factor 6.25. To clarify, a certain plant protein hydrolysate composition may contain 80 wt. % hydrolyzed plant protein and 20% other non-protein components. If this composition is present in the foamable beverage creamer in an amount of e.g. 4 wt. %, then the amount of hydrolyzed plant protein in the foamable beverage creamer is 3.2 wt. %.

The degree of protein hydrolysis (DH) is a standard method known to the skilled person. DH as used herein in connection with the invention is determined in the following way: DH of a protein sample is expressed as [non-protein nitrogen/total nitrogen]*100%.

Non-protein nitrogen (NPN) is prepared by dissolving an amount of protein in water, and adding trichloro acetic acid to precipitate the dissolved intact protein. The precipitate is removed by filtration and in the remaining liquid, the nitrogen content is measured according to the Kjeldahl method, using an Nitrogen factor of 6.25.

The total nitrogen (TN) of a sample is determined by the same Kjeldahl method using a Nitrogen factor of 6.25.

With these values of NPN and TN, the DH can be calculated.

Preferably, in another embodiment, the hydrolyzed plant protein has a degree of protein hydrolysis (DH) of at least 10%, more preferably at least 20, at least 30, at least 40 or at least 45%, most preferably at least 55%.

Preferably, the DH of the hydrolyzed plant protein is less than 95%, more preferably less than 90%, most preferably less than 85%.

In a more preferred embodiment, the DH of the hydrolyzed plant protein is between 40 and 75%.

Preferably, the hydrolyzed plant protein is hydrolyzed pea protein.

Very good results have been obtained with a pea protein hydrolysate having a specific range in degree of hydrolysis, Accordingly, in a most preferred embodiment, the hydrolyzed plant protein is a pea protein hydrolysate having a DH of between 40-75%.

A suitable plant protein hydrolysate is e.g. pea protein hydrolysate from Kerry, Ireland, sold under the name Hyfoama PRO. It has a protein content of 61 wt. %, measured as nitrogen content (N)×6.25, 1 wt. % fat, 2.5 wt. % total carbohydrates, 22 wt. % ash, and 4 wt. % moisture. The degree of hydrolysis of Hyfoama PRO was analyzed to be 62%.

In another preferred embodiment, the hydrolyzed plant protein is a rice protein hydrolysate having a degree of hydrolysis between 40-75%. A suitable hydrolysate is Hyfoama RS from Kerry, Ireland, having a degree of hydrolysis of 45%. It has a protein content of 53 wt. %, measured as nitrogen content (N)×6.25; 5.5 wt. % fat, 12 wt. % total carbohydrates, 13 wt. % organic acids, and 5 wt. % moisture.

The foamable creamer further comprises other constituents, which are present to further complete the functionality of the foamable creamer; these other constituents are selected from the group consisting of stabilizers, emulsifiers, free-flowing agents and buffering agents, non-starch polysaccharides such as xylan, glucan, arabinan and galactan, minerals and water. Suitable stabilizers comprise calcium- and magnesium binders such as preferably sodiumhexametaphosphate, polyphosphates and/or citric acid and/or its sodium or potassium salts; suitable emulsifiers may be selected from the group consisting of mono- and/or diglycerides, DATEM (Diacetyl tartaric acid ester of mono- and diglycerides), SSL (Sodium stearoyl-2-lactylate) and hydrophobic starch such as nOSA starch (n-octenyl succinic anhydride modified starch) preferably in amounts of 0.05-5 wt. % based on the foamable creamer; free-flowing agents may comprise tricalcium phosphate and/or silicon dioxide, preferably in amounts of 0.1-1.0 wt. % based on the foamable creamer; suitable buffering agents comprise mono and/or diphosphates, preferably in amounts of 0.5-3.0 wt. % based on the foamable creamer; most preferred is dipotassium phosphate.

Preferably, the foamable beverage creamer according to the invention contains 3.0-10.0 wt. %, more preferably 4.0-9.0 wt. %, most preferably 4.5-8.5 wt. % total protein, as determined by the Kjeldahl method using a nitrogen factor of 6.25.

The foamable creamer according to the invention can suitably be used as a foaming agent. Hence, in a preferred embodiment, the foamable creamer is preferably a foamer and has a poured bulk density preferably between 130-200 g/L, more preferably 135-190 g/L, most preferably 140-180 g/L. Such a foamer is obtained by incorporating or injecting a gas in the foamable creamer spray-drying production process.

Poured bulk density used herein in connection with the foamable creamer is determined by measuring the volume that a given weight of the powder occupies when poured through a funnel into a stationary graduated cylinder of 500 ml with a diameter of 10 cm.

The foamable beverage creamer according to invention preferably has a free fat content of less than 5 wt. %, more preferably less than 4 wt. %, most preferably less than 3 wt. %. the determination of free fat content is given in the examples.

Such a low free fat content is indicative for a good emulsification process. Furthermore, when the foamable creamer is applied in a beverage, no fat droplets are visible on the surface of the beverage; such floating fat droplets are considered an unattractive feature for a beverage.

Upon contact with an aqueous liquid, the gas is released, forming a foam on the liquid, such as a coffee-, tea- or chocolate beverage.

Alternatively, the foamable creamer may be used as a creamer, or whitener of beverages. Hence, in another embodiment, the foamable creamer according to the invention is preferably a creamer and has a poured bulk density preferably between 350-600 g/l, preferably between 370-570 g/L, more preferably between 390-550 g/L.

In a second aspect the invention relates to a method of preparing a spray dried, foamable beverage creamer, the method comprising a. Providing an aqueous dispersion comprising hydrolyzed oat and/or hydrolyzed rice flour;

b. mixing a vegetable oil or fat, carbohydrates and a hydrolyzed plant protein selected from the group of hydrolyzed pea protein, hydrolyzed rice protein and mixtures thereof with the aqueous dispersion of step (a) to obtain an aqueous foamer concentrate having a total dry solids content of 30-70 wt. %, based on the total weight of said aqueous foamer concentrate;

c. Emulsifying the aqueous foamer concentrate;

d. Optionally injecting a gas into the emulsified aqueous foamer concentrate; and e. Spray drying the aqueous foamer concentrate.

It is preferred that in step b, calculated on total dry solids content, the aqueous foamer concentrate comprises:

a) 1-15 wt. % of protein selected from the group of native oat protein, native rice protein, and mixtures thereof;

b) 15-60 wt. % of vegetable oil and/or vegetable fat;

c) 25-65 wt. % of carbohydrates d) 0.5-5% wt. % of hydrolyzed plant protein selected from the group of hydrolyzed pea protein, hydrolyzed rice protein and mixtures thereof;

e) 0-9 wt. % of other constituents preferably selected from the group consisting of stabilizers, emulsifiers, free-flowing agents and buffering agents, non-starch polysaccharides such as xylan, glucan, arabinan and galactan, Embodiments and amounts referring to the components of the foamable beverage creamer also apply to the components referred to in the process.

Herein, the term "hydrolyzed oat and/or hydrolyzed rice flour" is defined as a flour in which the carbohydrates, preferably the starch, has been hydrolyzed, and the proteins in the flour remain unhydrolyzed (also sometimes denoted as "intact"). Accordingly, preferably, the hydrolyzed oat and/or rice flour comprises native protein. Preferably the hydrolyzed oat and/or hydrolyzed rice flour comprises hydrolyzed starch.

Whereas the term "hydrolyzed flour" contains the term "flour", the skilled person will understand that the end-result of the flour hydrolysis step will result in a mixture of at least hydrolyzed starch and native protein. This mixture will thus not contain literally "flour", but rather its degradation product.

It has been found that a relatively high solids level in step a and b enable an efficient and cost-effective subsequent spray drying process, hence it is preferred that the dry solids content of the aqueous dispersion in step a is between 35-65 wt. % more preferably between 45-63 wt. %, most preferably between 50-60 wt. %, based on the total weight of the aqueous dispersion.

Preferably, the aqueous dispersion in step a. has a temperature between 60° and 90° C., more preferably between 65° and 85° C., most preferably between 67° and 80° C., as this enables an optimal mixing and dissolution of the fat and other components in step b.

The pH of the aqueous foamer concentrate from step b preferably has a pH between 5.0-7.0, more preferably between 6.0-6.8, most preferably between 6.2-6.5.

The emulsifying step c. is preferably a high pressure homogenization, more preferably a two-step high pressure homogenization. The homogenization pressure preferably comprises a range of 120-200 bar, more preferably 140-180 bar for the first homogenization step. The second homogenization step preferably comprises a range of 10-40 bar, more preferably 15-35 bar.

The temperature of the homogenization step lies preferably between 55-68° C.

If the foamable creamer needs to have a low poured bulk density in the range of 130-200 g/L, in order to function as a foamer per se, the optional step d. is carried out. Hence, in step d., a gas is injected in the aqueous foamer concentrate, wherein the gas preferably comprises nitrogen, air, or mixtures thereof. Most preferred is nitrogen. The skilled person is aware how to carry out such gasification steps.

If the foamable creamer should function as a creamer or whitener, step d. can be omitted.

In step e., the emulsified foamer concentrate is finally spray dried, preferably using a nozzle spray drier, preferably equipped with a high pressure nozzle. Preferably, the spray drying step takes place with an inlet temperature of 140-210° C. and an outlet temperature of 60-95° C.

In the course of the investigations leading up to the invention if was investigated if a flour dispersion comprising the fat, carbohydrates and hydrolyzed plant protein could be spray dried. It was found however that spray drying of a flour dispersion is not possible above 10 wt. % for viscosity reasons. As a consequence, when additional ingredients such as e.g. fat or oil and carbohydrates such as glucose syrup would be added to the flour dispersion needed to make a foamable beverage creamer, the skilled person will understand that even more problems with respect to viscosity are to be expected. However, when the starch in the flour was hydrolyzed first, it was found that a much higher solids content than 10 wt. could be attained, making the process more efficient. At the same time, by liberation of mono-, di and trisaccharides from the starch such as glucose, maltose and maltotriose, instant sweetness was created.

Accordingly, the aforementioned aqueous dispersion comprising hydrolyzed oat- and/or rice flour of step a. may conveniently be prepared by acquiring in the market a readily available hydrolyzed flour, in which the starch has been hydrolyzed to the desired extent.

Alternatively, the aqueous dispersion comprising hydrolyzed oat- and/or rice flour in step a. is preferably obtained comprising the steps of i. Providing an aqueous enzyme solution comprising a starch-degrading enzyme, the solution having a temperature of between 45°-70° C., preferably 45°-65° C.;

ii. Adding a starch-containing flour selected from the group of oat flour, rice flour and mixtures thereof to the enzyme solution of step i. until a flour dry solids content of 20-40 wt. % is reached, to obtain a reaction mixture;

iii. Keeping the reaction mixture for at least 5 minutes at a temperature of more than 45° C. until at least 5 wt. % of mono-and disaccharides based on dry weight of the flour has been formed; and iv. Inactivating the starch degrading enzyme.

The selected flours in step ii. also comprise native protein.

Preferably, the starch-degrading enzyme comprises an amylase, more preferably an alpha-amylase, most preferably a bacterial alpha-amylase. Suitable alpha-amylases are available from a number of suppliers, such as FoodPro® ALT from DuPont Industrial Services.

The amount of alpha-amylase used in step i. is preferably 0.02-0.5 wt. %, more preferably 0.04-0.3 wt. %, most preferably 0.06-0.2 wt. % based on dry weight of the flour.

Preferably, the alpha-amylase is used in step i. in amounts of 0.1-2.5 wt. %, more preferably 0.2-1.5 wt. %, most preferably 0.3-1.2 wt. % of a 20 wt./wt. % aqueous amylase solution which amylase solution has an enzyme activity of at least 26000 RAU/units/gram, based on dry weight of the flour. RAU is defined as Reference Amylase Units, a standardized amylase activity definition. The method to determine the RAU is given in https://www.enzymedevelopment-.com/wp-content/uploads/2011/10/Amylase-RAU -UNCO.pdf.

It was also found that the milling grade of the flour effected the conversion speed of the starch, hence, preferably, the starch-containing flour has a particle size characterized by a D90 of 150μ or less and/or a D50 of 60μ or less. The D90 is defined as the diameter where ninety percent of the distribution has a smaller particle size and ten percent has a larger particle size. The D50 is defined as the diameter where fifty percent of the distribution has a smaller particle size and fifty percent has a larger particle size. Such analysis can be carried out by a laser diffraction machine, e.g. a Mastersizer®, as will be known to the skilled person.

Preferably, the temperature of the reaction mixture in step ii. does not exceed the gelatinization temperature of the starch used with more than 10° C. Accordingly, the temperature of the reaction mixture is preferably kept below 65° C., more preferably below 60° C.

Advantageously, the flour used in the process of the invention preferably comprises enough protein to provide the required amount of protein in the foamable creamer of the invention. Therefore, the starch-containing flour preferably comprises a protein content of 4-18 wt. %, more preferably 6-15 wt. %, most preferably 7-13 wt. %.

Preferably, the flour used comprises oat flour, more preferably oat endosperm flour. Oat endosperm is obtained by air sifting of regular oat flour, and has the favorable D50 and D90 as mentioned above. Furthermore, any remaining fiber particles also have a small size distribution of less than 20μ. All these particle size features appeared to have a positive effect on the flour hydrolysis process of the invention. A suitable oat endosperm flour is e.g. Gluten Free Oat Endosperm Flour from Raisio, Finland.

It is preferred that in step ii, the flour is added to the enzyme solution in a fed-batch manner. A fed batch manner is a process wherein 1 or more reagents are added bit by bit to the reaction mixture, and not in one go. The method according to the invention wherein the flour is added to the starch-degrading enzyme is also different from conventional hydrolysis, wherein the enzyme is added to the flour dispersion. The method of the invention has the advantage that the starch in the flour is quickly converted, avoiding the build-up a very high viscosity.

The reaction mixture in step iii. comprising the starch-degrading enzyme and the flour is subjected, under stirring, to time/temperature conditions to accomplish an extensive hydrolysis of the starch in the flour. Extensive in the context of the invention will mean that essentially no intact starch is left over after hydrolysis; the hydrolysis will produce a mixture of mono-, di- and oligosaccharides. The extent of starch degradation can be followed by the skilled person by taking samples from the reaction mixture and studying it under a microscope. If essentially no intact starch granules are visible anymore, the starch is extensively hydrolyzed.

Therefore, the reaction mixture is preferably kept for at least 10 minutes, more preferably for at least 12 minutes, at a temperature of more than 45° C. Preferably, the reaction temperature in step iii. is at least 50° C. It is preferred to keep the temperature of the reaction mixture below 70° C., to avoid extensive gelatinization of the starch and damage to the enzyme.

The reaction mixture is kept under the temperature/time conditions as describes hereabove until preferably at least 10 wt. %, more preferably 12 wt. %, most preferably more than 15 wt. % of mono-and disaccharides based on dry weight of the flour has been formed.

In an embodiment, it is preferred that the reaction mixture is kept under the temperature/time conditions as described hereabove until preferably less than 10 wt. %, more preferably less than 5 wt. %, most preferably less than 1 wt. % of starch in the starch-containing flour is present in the reaction mixture. A method to determine the amount of starch is given in the RAU method as mentioned above for the amylase activity.

The inactivation of the enzyme in step iv. can be done according to the enzyme manufacturer's instructions. Preferably, the inactivating of the starch degrading enzyme comprises a heat treatment between 10-20 minutes at a temperature of 80-90° C., preferably 10-15 minutes at 85-90°.

It was surprisingly found that even though the enzyme inactivation conditions were not particularly mild for native proteins in oat and rice flour, it appeared that it did not harm their functionality in the foamable creamer.

In a third aspect, the invention relates to a method for preparing a foamed beverage having a foam layer on top comprising combining the foamable beverage creamer according to the invention with a liquid and optionally an additional powdered beverage composition.

The liquid used may be hot, for instance between 50 and 90° C., or cold, for instance between 5 and 25° C. The liquid used may be a coffee, tea- or chocolate preparation.

In an embodiment, the foam layer may be obtained by combining 2-12 grains of foamable beverage creamer with 75-200 mL grams of liquid.

Suitable preparation methods comprise manual stirring, electric whipping (such as using an "Aeroccino"®) or dispensing through a coffee machine using sealed capsules, such as an "Dolce Gusto"® apparatus.

In a fourth aspect, the invention relates to a sealed capsule comprising the foamable beverage creamer according to the invention. The capsule is preferably sealed with thin film, for instance aluminium or plastic. The capsule is designed to allow injection under pressure of a liquid into the capsule. As a result, the contents of the capsule will dissolve, and due to the increasing pressure, the film will break and the dissolved foamable beverage foamer is discharged from the capsule. A suitable capsule is disclosed in EP 1808382.

In a fifth aspect, the invention relates to a spray dried foamable beverage creamer obtainable by the method comprising a. Providing an aqueous dispersion comprising hydrolyzed oat- and/or rice flour;

b. mixing a vegetable oil or fat, carbohydrates and a hydrolyzed plant protein with the aqueous dispersion of step (a) to obtain an aqueous foamer concentrate having a total dry solids content of 35-65 wt. %;

c. Emulsifying the aqueous foamer concentrate;

d. Optionally injecting a gas into the emulsified aqueous foamer concentrate; and e. Spray drying the aqueous foamer concentrate.

All details and embodiments provided above for the method of making the foamable beverage creamer are applicable to the product according to the fifth aspect of the invention.

Experimental Section

Materials and Methods

Poured bulk density used herein in connection with the foamable creamer is determined by measuring the volume that a given weight of the powder occupies when poured through a funnel into a stationary graduated cylinder, for instance a 500 ml cylinder with a diameter of 10 cm.

The degree of protein hydrolysis (DH) is a standard method known to the skilled person, and can be determined in the following way:

DH of a protein sample is expressed as [non-protein nitrogen/total nitrogen]*100%.

Non-protein nitrogen (NPN) is prepared by dissolving an amount of protein in water, and adding trichloro acetic acid to precipitate the dissolved intact protein. The precipitate is removed by filtration and in the remaining liquid, the nitrogen content is measured according to the Kjeldahl method, using an Nitrogen factor of 6.25.

The total nitrogen (TN) of a sample is determined by the same Kjeldahl method using a Nitrogen factor of 6.25.

With these values of NPN and TN, the DH can be calculated.

EXAMPLES

Example 1 according to the invention—Oat flour (50 wt. % on final foamable creamer) 20% fat, and pea protein hydrolysate 3 wt. %.

55 Kg oat flour (Gluten free oat endosperm fraction OEF flour obtained from Raisio, Finland) was added to 95 kg water (65° C.) that already contained the alfa amylase enzyme Food Pro ALT® from Dupont Industrial Services (20% wt./wt. solution) in an amount of 0.35 kg, to arrive at an approximate 30-35% dry matter oat flour dispersion. The oat flour was added gradually under good stirring and hydrated for 2-3 minutes. Then the oat flour dispersion, that remained well stirrable and did not become too viscous, was heated with steam injection within 2-3 minutes to 65° C. The oat flour was converted with the starch hydrolyzing amylase enzyme during 15 min at a temperature optimally between 65-70° C., in this case 65° C. was used.

Gelatinization of the starch granules will occur at the start of conversion at a slow pace at temperatures close to 65° C. Meanwhile, the dispersion could be stirred without any problem with a normal propeller stirring device. The conversion time is optionally not longer than 15 minutes with an enzyme dosing of around 0.4-0.8 wt. % expressed on total used oat flour.

The degree of hydrolysis is such that around up to 15-20% of glucose and maltose (combined and expressed as wt. % on the used oat flour) is formed by enzymatic hydrolysis from the oat starch, so typical in this case analysis of the final product by HPAED-PAD for determining mono and disaccharides (i.e. glucose and maltose) after spray drying did show a total content of 7.2 gr/100 gr dry powder of sugars (sum of wt. % of glucose and maltose).

Then after the total hydrolysis time of 15 minutes was completed the hydrolyzed oat flour slurry was heated again by steam injection within 3-5 minutes to at least 90° C. After stirring of another 10-15 minutes the inactivation of the enzyme was completed while keeping the temperature at least between 88-90° C. during this time period.

Then, the addition under moderate stirring of the other raw materials was done in the order of: 26 kg of glucose syrup powder (Roquette DE 28-30), 2 kg of the buffering agent dipotassium phosphate, 3 kg of Hyfoama Pro from supplier Kerry (a pea protein hydrolysate) and finally 20 kg liquid non-hydrogenated coconut fat, that was heated up to 50° C. before in order to melt the fat completely. Extra water was added to correct and arrive at a dry matter of around 50 wt. %.

The emulsion was homogenized at around 50% dry matter, with pressures of 160 bar first stage and 30 bar second stage with a high pressure homogenizer at a temperature of around 65-70° C. The liquid emulsion was fed via a pump to a scraped surface heat exchanger for short time pasteurization. Heat pasteurization was performed for 25-30 seconds at 80-84° C., and the emulsion was then fed to a high pressure pump, and atomized under high pressure in a Filtermat spray drier. Drying inlet temperatures of about 150° C. and outlet temperatures in the range of 75-85° C. were used, to arrive at powders with a moisture content between 2.0-4.0%. The powder density that was obtained ranged typically from 450 to 550 gr/L, determined as poured bulk density. The obtained powder was tested for foamability, coffee stability and sensory, and for free fat %. For all functionality parameters very good values and scores obtained for this example, see table 2.

Example 2a, 2b according to the invention.

Example 2a (35 wt. % oat flour on final foamable creamer) and example 2b (25 wt. % oat flour on final foamable creamer)

As described in example 1, another 2 variants were prepared in a very similar way as example 1, but with different oat flour percentage, being 35% and 25% expressed on wt. % for the obtained spray dried powders, see table 1.

The amount of enzyme was adjusted as described based on the amount of used oat flour, with an enzyme dosing of around 0.7 wt. % expressed on oat flour. The % dry matter for the hydrolysis step was again in the range of 30-35%. The different amounts of oat flour were compensated with the glucose syrup power and the lack of protein for variant 2b was compensated with a higher amount of Hyfoama Pro pea protein hydrolysate by using 4 kg instead of 3 kg (see table 1). Additional water was added to correct for the final emulsion dry matter % to arrive at approximately the same 50% dry matter.

The obtained powder was tested for foamability, coffee stability and sensory, and for free fat %. For all functionality parameters good values (high foam volume and low free fat %) and scores were obtained, see table 2.

The amount of mono and disaccharides (glucose and maltose) that was achieved in these 2 examples was analyzed by HPAED-PAD for the powder obtained after spray drying. A total content of 8.7 gr/100 gr and 10.0 gr/100 gr dry powder of sugars (total of mono- and disaccharides combined), was determined for example powder 2a and 2b, respectively.

Example 2c according to the invention, with 60% fat.

According to example 1, another variant 2c was prepared with an increased fat %, the amount of coconut fat was increased from 20% to 60%, no use of glucose syrup was made, as hydrolyzed oat flour completely replaced glucose syrup as ingredient, see table 1. Oat flour and pea protein hydrolysate were added to an amount of 33.5 wt. % and 4.5 wt. %, respectively. The protein hydrolysate level was increased as to keep the fat to protein ratio at least closer to ratio fat to protein of the earlier described examples 1, 2a, and 2b. The obtained powder was tested for foamability, coffee stability and sensory, and for free fat %, see table 2. The free fat % was determined and compared with the other examples it showed to be increased to quite some extent, from typically <2% to 42%. Nevertheless the obtained product is assumed to be acceptable as high fat creamer for other than coffee applications because it does not have to withstand the harsh instant hot coffee application conditions.

Example 3a according to the invention, with DATEM emulsifier.

According to example 1, another variant 3a was prepared where in addition of oat protein (originating from the hydrolyzed oat flour) and pea protein hydrolysate also another surface active ingredient was applied. At the expense of a reduction of 2 wt. % of glucose syrup solids, 2 wt. % of DATEM was used in the formulation of example 3a. The obtained powder was tested for foamability, coffee stability and sensory, and for free fat %. DATEM as additional surface active ingredient increased to some extent the foaming properties from a value of 100-120 mL to the order of 150-175 mL of foam generated. Again, for all functionality parameters good values (high foam volume and low free fat %) and scores were obtained, see table 2.

Example 3b according to the invention, not using pea protein hydrolysate (PPH) but rice protein hydrolysate (RPH), with DATEM as additional emulsifier. According to example 1, another variant, 3b, was prepared where in addition of oat protein (originating from the hydrolyzed oat flour), DATEM as surface active ingredient, instead of PPH a similar quantity of RPH was applied. Similarly as described for example 3a, at the expense of a reduction of 2 wt. % of glucose syrup solids, 2 wt. % of DATEM was used in the formulation of example 3b. The obtained powder was tested for foamability, coffee stability and sensory, and for free fat %. Again, for all functionality parameters relatively good values (high foam volume and low free fat %) and scores were obtained, see table 2.

Example 4 according to the invention: using rice flour and DATEM.

Example 3 was repeated in that instead of oat flour, pregelatinized rice flour, type R90, supplied by Kroener Staerke, was used. Because of the typical lower protein content of rice flour (8% protein), compared to that of oat flour (12% protein), additional emulsifier (DATEM) was used to compensate for this lack of sufficient surface active ingredients caused by the lower protein content of rice flour. In this example DATEM was used in addition in an amount of 2 wt. % on dry matter, again compensating with 2 wt. % less glucose syrup powder. The product and powder obtained performed overall very well, and clearly the use of other flours than oat could provide functional foamable creamers for a broad range of instant beverage applications. The obtained powder was tested for foamability, coffee stability and sensory, and for free fat %. For all functionality parameters good values (high foam volume and low free fat %) and scores were obtained, see table 2.

Example 5a comparative—using non-hydrolyzed oat flour.

According to example 1, another variant 5a was tried to formulate where no enzymatic flour hydrolysis step was executed. Instead, the oat flour was applied in its non-hydrolyzed form.

This example was leading to very high viscosities already in an early stage of the process applying processing temperatures within the range of 50-70° C. due to uncontrolled gelatinization. This variant was not further elaborated because of the limitations of such high viscosity would put on both the homogenizing and atomizing processing step, to arrive at a well emulsified spray dried powder.

Example 5b comparative—using Pea protein Isolate instead of Pea Protein Hydrolysate.

According to example 3 another variant 5b was prepared where, instead of pea protein hydrolysate, pea protein isolate (Pisane C9, obtained from Cosucra, Belgium; protein content 82 wt. %) was applied. Both a low (results not shown) and a high % of PPI (6 wt. %) did not lead to satisfactory products that were stable in the coffee test. The coffee test value that was obtained was very low (a score of 1 instead of 5), see table 1. Even the additional use of DATEM to help to improve both foamability and coffee stability did not result into such satisfactory functionality, as shown in table 1.

Example 5c comparative—without plant protein hydrolysate.

According to example 1, another variant 5c was prepared where no pea protein hydrolysate was applied. The obtained powder was tested for foamability, coffee stability and sensory, and for free fat %, see table 2. Clearly the lack of coffee stability (a score value of 2) is evident compared to example 1 (a score value of 5). Nevertheless the taste and foamability still were acceptable.

Example 5d comparative—using soy flour.

According to example 3, another variant 5d was prepared where the hydrolysis of oat flour was executed with full fat toasted soybean flour (supplied by BIC Protein under the brand of Sofarine), instead. The amount of soybean flour (of which 38% is composed of protein) used was adapted to arrive for the final foaming creamer at more or less the same total protein percentage of the final creamer (being 7.8% protein) as in case of the use of oat flour (of which 12% is composed of protein), see table 3. The soybean flour also contains fat in a typical percentage of 21%, for which not was compensated with a lower coconut fat %. The obtained powder was tested for foamability, coffee stability and sensory, and for free fat %. Both taste and coffee stability were clearly not on par with the examples according to the invention, see table 2.

Example 5e comparative—without hydrolyzed oat flour.

According to example 1, another variant 5e was prepared where no additional hydrolyzed oat flour was applied. The obtained powder was tested for foamability, coffee stability and sensory, and for free fat %, see table 2. Clearly the lack of foamability (foam<10 mL)) is evident compared to example 1 (foam 110 mL). The coffee stability and taste still were acceptable.

Example 5f comparative—without using both hydrolyzed oat flour and hydrolyzed pea protein.

According to example 1, another variant 5f was prepared where no pea protein hydrolysate was applied, but rice protein hydrolysate, this in absence of hydrolyzed oat flour. Instead of the earlier used stabilizer DKP and emulsifier DATEM, here a combination of sodium bicarbonate and citric acid as stabilizer and lecithin as emulsifier was used. This creamer was prepared according to the prior art described in example 4 of WO2019/122336. The obtained powder was tested for foamability, coffee stability and sensory, and for free fat %, see table 2. Clearly the lack of foamability (foam<10 mL) is evident compared to example 1.

The taste and coffee stability still were acceptable.

TABLE 1

Compositions of all examples, in wt./wt. % on dry product.

| Examples | 1 | 2a | 2b | 2c | 3a | 3b | 4 | 5a | 5b | 5c | 5d | 5e | 5f |
|---|---|---|---|---|---|---|---|---|---|---|---|---|---|
| Oat flour (hydrolyzed) | 50 | 35 | 25 | 33.5 | 50 | 50 | | | 50 | 50 | | | |
| Oat flour (not hydrolyzed) | | | | | | | | 50 | | | | | |
| Non-hydrogenated coconut fat | 20 | 20 | 20 | 60 | 20 | 20 | 20 | 20 | 20 | 20 | 20 | 20 | 34 |
| Glucose syrup | 25 | 40 | 49 | 0 | 23 | 23 | 23 | 23 | 20 | 28 | 57 | 75 | 61 |
| DKP | 2 | 2 | 2 | 2 | 2 | 2 | 2 | 2 | 2 | 2 | 2 | 2 | |
| PPH | 3 | 3 | 4 | 4.5 | 3 | x | 3 | 3 | x | x | 3 | 3 | |
| Rice flour (hydrolyzed) | | | | | | 50 | | | | | | | |
| RPH | | | | | | 3 | | | | | | | 2.3 |
| DATEM | | | | | 2 | 2 | 2 | 2 | 2 | x | 2 | | |
| PPI | | | | | | | | | 6 | | | | |
| Soy flour (hydrolyzed) | | | | | | | | | | | 16 | | |
| Citric acid | | | | | | | | | | | | | 0.7 |
| Sodium bicarbonate | | | | | | | | | | | | | 1.5 |
| Lecithin | | | | | | | | | | | | | 0.5 |

DKP = Dipotassium Phosphate
PPH = Pea Protein Hydrolysate: Hyfoama PRO, Kerry, degree of hydrolysis 62%.
RPH = Rice Protein Hydrolysate: Hyphoama RS, Kerry, degree of hydrolysis is 45%.
PPI = Pea Protein Isolate Analyses.

Foam Test:

10 grams of powder was dissolved with gentle stirring by spoon in 90 grams of water with a temperature between 35-45° C. to arrive at a 10% dry matter solution. This solution was transferred after complete dissolution of the powder to a so-called milk foamer that is commercially known under the name Nespresso® Aeroccino 1. The button that starts heating and foaming at the same time was pressed. Typically, the foaming element takes around 70-80 seconds of stirring while the liquid is heated to arrive at a fixed final maximum temperature of the foamed liquid of 60-65° C. The amount of foam was determined by pouring the foamed liquid in a tall form beaker and measuring the foam height in amount of mL's generated foam.

Stability and Sensory Test in Coffee Application 2-in-1:

Coffee Sensory Score:

5 grams of powdered creamer were mixed with 2 grams of instant coffee (DE Moccona Roodmerk), to this dry mix powder 150 mL of hot water (90-95° C.) was added with manual stirring for 20 seconds with a standard coffee spoon.

A sensory score was given after tasting with a small taste panel. The rating of the scores ranged from very good with a score of 5 to bad with a score of 1. Scores are described and defined as: 5, no off taste and very neutral (creamy and balanced); 4, close to neutral (creamy and balanced); 3, slight off taste but still acceptable (creamy); 2, off taste (not creamy nor balanced); 1, extreme off taste (not creamy nor balanced).

Coffee Stability Score:

5 minutes after stopping the stirring of the 2-in-coffee application, the coffee top surface was evaluated for colour and white spots or any small protein aggregates. Next to that also small fat droplets or fatty eyes on the surface where looked for and the more white spots or aggregates and fat droplets where counted at the surface during evaluation, the lower the score was for the coffee stability test. In addition, the colour of the coffee was checked and rated as well and taken into account for the score height. The more brown and less white creamy colour of the coffee application, the lower the rating was for stability. High stability was rated with a 5 and very low stability was rated with a score of 1. A score of 1 or 2, indicating separation of fat droplets while forming a separate creamy fat upper layer and some reasonable high amount of protein aggregates visible on top or aggregates shown as sediment on the bottom of the beaker containing the coffee.

Free Fat %:

The determination of free fat on the surface of powder particles is based on extraction of the fat on the surface of the particles, and is used in various types of adapted forms. The method applied was a version in adapted form of the method described by GEA Niro Research Laboratory (https://www.gea.com/en/binaries/A%2010%/ 20a_Surface%20Free%20Fat%20of%20Powder _tcm11-30918.pdf) The method is typically used for whole milk powder and all other dried dairy products containing fat. The content of free fat on the surface of the creamer or fat powder particles is defined as the evaporation residue remaining, after the sample has been gently mixed with petroleum ether, filtered and dried.

Method HPAED-PAD: Determination Glucose and Maltose Content of Final Produced Powders.

The HPAED-PAD method was used to determine sugars (glucose, fructose, galactose, maltose, sucrose) in the obtained products. HPAED-PAD is an high performance anion exchange chromatographic method with pulsed amperometric detection. The carbohydrates were determined by HPAED-PAD using an ion exchange column, sodium hydroxide and sodium acetate in UHQ water as mobile phase and a pulsed amperometric detection. The substances were detected based on retention times and determined by external standards using peak heights. This HPAED-PAD method is known and referenced by as the CEN/TS 15754 modified standard sugar determination method for animal feeding stuffs.

TABLE 2

| | Functionality tests: foamability, taste, coffee stress test, free fat % analysis, and sugar % (glucose and maltose) | | | | | | | | | | | | |
|---|---|---|---|---|---|---|---|---|---|---|---|---|---|
| Examples | 1 | 2a | 2b | 2c | 3a | 3b | 4 | 5a | 5b | 5c | 5d | 5e | 5f |
| mL foam | 110 | 120 | 100 | 15 | 175 | 125 | 70 | — | 70 | 100 | 200 | <10 | <10 |
| Sensory score | 5 | 5 | 5 | 5 | 5 | 5 | 4 | — | 5 | 5 | 3 | 5 | 4 |
| Stability score | 5 | 5 | 5 | 3 | 5 | 3 | 5 | — | 1 | 2 | 2 | 3 | 4 |
| Free fat % | 0.7 | 0.6 | 0.5 | 42.1 | 1.8 | 1.3 | 0.5 | — | 11.0 | 2.1 | 0.6 | 0.4 | 7.2 |
| Glucose % | 2.7 | 3.8 | 4.5 | nd | nd | nd | nd | — | nd | nd | nd | nd | nd |
| Maltose % | 4.5 | 4.9 | 5.5 | nd | nd | nd | nd | — | nd | nd | nd | nd | nd | nd: not determined

The results of the tests show that the foamable creamer according to the invention has a good taste, is coffee stable, shows low free fat and provides a very good and high foam layer. The prior art test 5f however clearly shows from table 2 that this product, a creamer, does not foam at all and moreover shows an unacceptable free fat level of 7.2%.

TABLE 3

| | Compositional data (by calculation): protein (origin), total carbohydrates, and total protein (in g/100 g). | | | | | | | | | | | | |
|---|---|---|---|---|---|---|---|---|---|---|---|---|---|
| Examples | 1 | 2a | 2b | 2c | 3a | 3b | 4 | 5a | 5b | 5c | 5d | 5e | 5f |
| Native protein (oat flour) | 6.0 | 4.2 | 3.0 | 4.0 | 6.0 | 6.0 | x | 6.0 | 6.0 | 6.0 | x | x | x |
| Native protein (rice flour) | x | x | x | x | x | x | 4.0 | x | x | x | x | x | x |
| Native protein (soy flour) | x | x | x | x | x | x | x | x | x | x | 6.1 | x | x |
| Protein (PPH) * | 1.8 | 1.8 | 2.4 | 2.7 | 1.8 | x | 1.8 | 1.8 | x | x | 1.8 | 1.8 | x |
| Protein (RPH)** | x | x | x | x | x | 1.6 | x | x | x | x | x | x | 1.6 |
| Protein (PPI) | x | x | x | x | x | x | x | x | 4.9 | x | x | x | x |
| Total Carbohydrates | 58 | 63 | 65 | 22 | 56 | 56 | 56 | 56 | 59 | 61 | 61.5 | 75 | 61 |
| Total protein | 7.8 | 6.0 | 5.4 | 6.7 | 7.8 | 7.6 | 5.8 | 7.8 | 10.9 | 6.0 | 7.9 | 1.8 | 1.6 |

* Pea Protein Hydrolysate (Kerry) has a protein content of 61 wt. %, which means a dosage of 3 wt. % of hydrolysate equals 3*0.61 = 1.8 wt. % protein. The protein contents of the vegetable flours used and pea protein isolate are given in the examples and description.
**Rice Protein Hydrolysate (Kerry) has a protein content of 53 wt. %, which means a dosage of 3 wt. % of hydrolysate equals 3*0.53 = 1.6 wt. % protein.

The invention claimed is:

1. A spray-dried, foamable beverage creamer comprising:
(a) 1-15 wt. % of protein selected from the group of native oat protein, native rice protein, and mixtures thereof;
(b) 15-60 wt. % of vegetable oil and/or vegetable fat;
(c) 25-65 wt. % of carbohydrates;
(d) 0.5-5 wt. % of hydrolyzed pea protein;
(e) 0-9 wt. % of other constituents selected from stabilizers, emulsifiers, free-flowing agents, buffering agents, xylan, glucan, arabinan, galactan, minerals, and water;
wherein components (a)-(e) together form 100% by weight of the spray-dried, foamable beverage creamer.

2. The foamable beverage creamer according to claim 1, wherein the vegetable fat or oil comprises palm oil, palm kernel oil, coconut oil, sunflower oil, high oleic sunflower oil, rapeseed oil, soy oil, or mixtures thereof.

3. The foamable beverage creamer according to claim 1, wherein the carbohydrates comprise 10-30 wt. % of mono- and disaccharides selected from glucose, maltose, and mixtures thereof.

4. The foamable beverage creamer according to claim 1, wherein the hydrolyzed plant protein has a DH of at least 10%.

5. The formable beverage creamer according to claim 1, wherein the creamer has a poured bulk density between 130-200 g/L.

6. The foamable beverage creamer according to claim 1, wherein the creamer has a poured bulk density between 350-600 g/L.

7. The foamable beverage creamer according to claim 1, wherein the native oat and/or native rice protein is present in an amount of 2.5-14 wt. %.

8. A method of preparing the spray-dried foamable beverage creamer according to claim 1, the method comprising:
(a) providing an aqueous dispersion comprising hydrolyzed oat and/or hydrolyzed rice flour;
(b) mixing a vegetable oil or fat, carbohydrates and hydrolyzed pea protein with the aqueous dispersion of (a) to obtain an aqueous foamer concentrate having a total dry solids content of 30-70 wt. %, based on the total weight of said aqueous foamer concentrate;
(c) emulsifying the aqueous foamer concentrate;
(d) optionally injecting a gas into the emulsified aqueous foamer concentrate; and
(e) spray drying the emulsified aqueous foamer concentrate.

9. The method according to claim 8, wherein the aqueous dispersion comprising hydrolyzed oat and/or hydrolyzed rice flour in (a) is prepared by:

(i) providing an aqueous enzyme solution comprising a starch-degrading enzyme, the solution having a temperature of between 45°–70° C.;

(ii) adding a starch-containing flour selected from the group of oat flour, rice flour and mixtures thereof to the aqueous enzyme solution of (i) until a flour dry solids content of 20-40 wt. % is reached, to obtain a reaction mixture;

(iii) keeping the reaction mixture for at least 5 minutes at a temperature of more than 45° C. until at least 5 wt. % of mono-and disaccharides based on dry weight of the flour has been formed; and (iv) inactivating the starch degrading enzyme.

10. The method according to claim 9, wherein the starch-containing flour has a particle size defined by a D90 of 150 μ or less and/or a D50 of 60 μ or less.

11. The method according to claim 9, wherein the starch-containing flour comprises a protein content of 6-20 wt. %.

12. The method according to claim 9, wherein in (ii) the starch-containing flour is added to the aqueous enzyme solution in a fed-batch manner.

13. The method according to claim 8, wherein the hydrolyzed pea protein in (b) comprises hydrolyzed pea protein having a degree of hydrolysis between 40-75%.

14. A method for preparing a foamed beverage having a foam layer on top of the foamed beverage, the method comprising combining the foamable beverage creamer according to claim 1 with a liquid and optionally an additional powdered beverage composition.

15. A sealed capsule comprising the foamable beverage creamer according to claim 1.

* * * * *